United States Patent
Lee et al.

(10) Patent No.: US 10,995,734 B2
(45) Date of Patent: May 4, 2021

(54) VESSEL FOR TRANSPORTING AND INSTALLING OFFSHORE WIND POWER GENERATOR

(71) Applicants: KOREA ELECTRIC POWER CORPORATION, Naju-si (KR); IL HO SEE TECH CO., LTD., Gunsan-si (KR); XINNOS Co., Ltd., Yeongam-gun (KR); SM Instruments, Inc., Daejeon (KR)

(72) Inventors: Jun-Shin Lee, Daejeon (KR); Hong-Kyou Cho, Seoul (KR); Yang-Ryul Choi, Seoul (KR); Young-Key Kim, Daejeon (KR); Ji-Young Kim, Daejeon (KR); Moo-Sung Ryu, Daejeon (KR); Min-Uk Jung, Daejeon (KR); Dong-Ho Cho, Daejeon (KR)

(73) Assignees: KOREA ELECTRIC POWER CORPORATION., Naju-si (KR); IL HO SEE TECH CO., LTD., Gunsan-si (KR); XINNOS CO., LTD., Yeongam-Gun (KR); SM INSTRUMENTS INC., Daejeon (KR)

( * ) Notice: Subject to any disclaimer, the term of this patent is extended or adjusted under 35 U.S.C. 154(b) by 0 days.

(21) Appl. No.: 16/436,388

(22) Filed: Jun. 10, 2019

(65) Prior Publication Data

US 2020/0386208 A1 Dec. 10, 2020

(51) Int. Cl.
*B63B 35/44* (2006.01)
*F03D 13/40* (2016.01)
(Continued)

(52) U.S. Cl.
CPC .............. *F03D 13/40* (2016.05); *B63B 25/28* (2013.01); *B63B 35/003* (2013.01); *E02B 17/02* (2013.01);
(Continued)

(58) Field of Classification Search
CPC ....... B63B 25/006; B63B 25/28; B63B 35/00; B63B 35/003; B63B 35/28; B63B 35/40;
(Continued)

(56) References Cited

U.S. PATENT DOCUMENTS

| 8,613,569 | B2 * | 12/2013 | Belinsky | ................ E02D 27/42 405/203 |
| 2012/0219364 | A1 * | 8/2012 | Li | ........................ B63B 35/003 405/209 |
| 2019/0071830 | A1 | 3/2019 | Lindblade et al. | |

FOREIGN PATENT DOCUMENTS

| KR | 2012-107586 A | 6/2012 |
| KR | 10-1407431 B1 | 6/2014 |

(Continued)

*Primary Examiner* — Daniel V Venne
(74) *Attorney, Agent, or Firm* — Foundation Law Group, LLP

(57) ABSTRACT

The present invention relates to a vessel for transporting and installing a offshore wind power generator. The vessel for transporting and installing a offshore wind power generator according to an embodiment of the present invention includes: a support frame enabling a offshore wind power generator to lie moved perpendicularly to a vessel body through a vessel body opening portion formed at a tail of the vessel body; and a sliding deck being able to move horizontally with respect to the vessel body to open and close the vessel body opening portion.

4 Claims, 5 Drawing Sheets

(51) Int. Cl.
*B63B 35/00* (2020.01)
*E02B 17/02* (2006.01)
*B63B 25/28* (2006.01)
*E02B 17/00* (2006.01)

(52) U.S. Cl.
CPC ............... *E02B 2017/0047* (2013.01); *F05B 2230/6102* (2013.01)

(58) Field of Classification Search
CPC ... B63B 35/44; B63B 35/4433; B63B 35/446; F03D 13/40; F05B 2230/6102; E02B 17/02; E02B 2017/0047
USPC ..... 114/44, 72, 73, 256, 258, 259, 264, 266, 114/267
See application file for complete search history.

(56) References Cited

FOREIGN PATENT DOCUMENTS

| | | |
|---|---|---|
| KR | 10-1511174 B1 | 4/2015 |
| KR | 10-2015-0084913 A | 7/2015 |
| KR | 10-2015-0115977 A | 10/2015 |
| KR | 10-2016-0016390 A | 2/2016 |
| KR | 10-1790970 B1 | 10/2017 |
| KR | 10-2018-0003214 A | 1/2018 |
| KR | 10-1804519 B1 | 1/2018 |

\* cited by examiner

VESSEL FOR TRANSPORTING AND INSTALLING OFFSHORE WIND POWER GENERATOR

BACKGROUND OF THE INVENTION

1. Technical Field

The present invention relates to a vessel for transporting and installing an offshore wind power generator and, more particularly, to a vessel for transporting and installing an offshore wind power generator, the vessel being intended to transport and install an offshore wind power generator stably under a sea environment by assembling a substructure and a wind power turbine in advance at shore such as in a harbor or at a quay wall of a shipyard, loading the entire structure, and transporting and installing the entire structure at a target site.

2. Description of the Related Art

In general, a wind power generator is composed of a nacelle, a rotor, a support structure, etc.

The nacelle includes devices for converting torque obtained by the rotor into electrical energy. The rotor, which is a device converting the energy of wind into torque, has a plurality of blades. The support structure is a structure that supports die wind power generator.

Such a wind power generator, an apparatus that provides power produced by converting the power of wind into torque to consumers, is usually installed places where the power of wind can be used such as mountains, hinterlands, and the sea.

In particular, a method of assembling parts at the open sea, which is the installation place of a wind power generator, using a jack-up barge and a plurality of cranes has been used in order to assemble a wind power generator on the sea in the related art.

However, special work environments on the sea have to be considered to use this method, so the insinuation cost is excessive and the installation lime is also long, and accordingly, an economical installation method that can replace this method's required.

Further, when the water depth is large at the place where a wind power generator is installed, it is difficult to estimate the time and cost that will be taken by work and a problem is also generated with the safety and fatigue of workers due to long-period of work time.

Therefore, there is a need for a plan that can assemble the entire wind power generator and then can stably transport the entire structure to the installation place using a special vessel in order to install a wind power generator.

SUMMARY OF THE INVENTION

An object of the present invention is to provide a vessel for transporting and installing an offshore wind power generator, the vessel being intended to transport and install an offshore wind power generator stably under a sea environment by assembling a substructure and a wind power turbine at the shore such as in a harbor or at a quay wall of a shipyard, loading the entire assembly, and transporting and installing the assembly at a target site.

A vessel for transporting and installing an offshore wind power generator according to an embodiment of the present invention includes: a support frame enabling a offshore wind power generator to be moved perpendicularly to a vessel body through a vessel body opening portion formed at a tail of the vessel body; and a sliding deck being able to move horizontally with respect to the vessel body to open and close the vessel body opening portion.

According to an embodiment, the vessel may further include a plurality of spuds disposed at specific positions on the vessel body to fix the vessel body by vertically moving down to the bottom of the sea.

The spuds may be installed with a rotational angle about a vertical axis maintained within 5° in consideration of a cable direction of the offshore wind power generator and with a lower support of the offshore wind power generator maintained within a maximum radius of 5 m at designated coordinates on the bottom of the sea.

The support frame may be an A-type frame disposed perpendicularly to the vessel body.

The support frame may have a wind that is connected to the offshore wind power generator to vertically lift up or put down the offshore wind power generator.

The support frame may have a clamp that supports an upper end of the center of gravity of the offshore wind power generator when the offshore wind power generator is transported or vertically moved.

The clamp may be composed of four hydraulic devices orthogonally coupled to each other to support the upper end of the center of gravity of the offshore wind power generator.

The clamp may maintain a rotations angle about a horizontal axis of the offshore wind power generator within maximum 7°.

The sliding deck may be a pan on which the offshore wind power generator is seated when the offshore wind power generator is transported.

The sliding deck may lie formed on the vessel body or is formed through sliding channels formed on sides of the vessel body opening portion.

The vessel body may be expanded into a structure that can load, transport, and install a plurality of offshore wind power generators by connecting vessel bodies of other vessels to each other.

The entire wind power generator may be loaded, transported, and installed at one time after being assembled in advance at a quay wall of a harbor.

According to the present invention, it is possible to transport and install an offshore wind power generator stably under a sea environment by achieving a vessel that can load the entire structure, and transport and install an entire structure at a target site after a substructure and a wind power turbine are assembled in advance at a quay wall of a harbor.

Further, according to the present indention, it is possible to reduce the time for disposing a completely assembly offshore wind power generator on a vessel body, provide stability in transportation on the sea, and reduce the work lime for installing the offshore wind power generator at an installation place.

Further, according to the present invention, it is possible to provide a special vessel that can load, transport, and install one or two completely assembly offshore wind power generators simultaneously.

Further, according to the present invention, it is possible to replace the jacket-type substructure of the related art and considerably reduce the time and cost for installation in comparison to the jacket-type substructure of the related art because it is possible to use a suction pile method that installs the substructure of an offshore wind power generator using only the water pressure difference inside and outside the pile.

Further, according to the present invention, it is possible to stably cope with changes in sea environment by fastening and fixing an offshore wind power generator on a vessel body with minimum interference of cables when transporting the offshore wind power generator.

Further, according to the present invention, it is possible to remarkably reduce the installation time and enable minimum workers to stably install an offshore wind power generator, as compared with existing assembly methods, because it is possible to install the entire offshore wind power generator at one time, including a substructure.

Further, according to the present invention, it is possible to instigate great changes such as improving the economic value of set wind and reducing business risks because it is possible to replace the exclusive vessels for installation of wind power generation facilities on the sea that are currently generally used in Europe.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
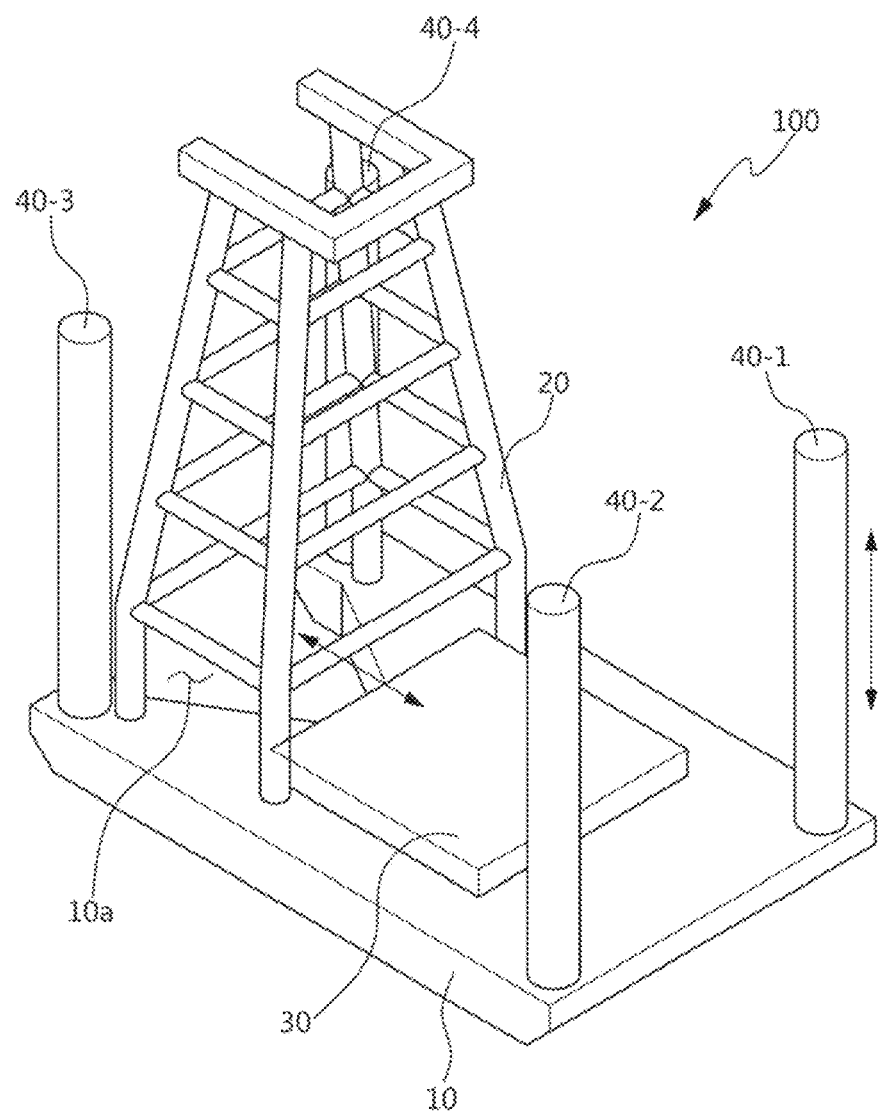
FIG. 1 is a view showing a vessel for transporting and installing an offshore wind power generator according to an embodiment of the present disclosure.

Hereinafter, exemplary embodiments of the present invention will be described in detail with reference to the accompanying drawings. However, well-known function or configurations that may make the spirit of the present invention unclear are not described in detail in the following description and the accompanying drawings. Further, it should be noted that the same components are given the same reference numerals in the drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the terms and words as terms for describing most appropriately the best method he or she knows for carrying out the invention.

Accordingly, the embodiments described herein and the configurations shown in the drawings are only most preferable embodiments of the present invention and do not represent the entire spirit of the present invention, so it should be appreciated that there may be various equivalents and modifications that can replace the embodiments and the configurations at the time at which the present application is filed.

In the accompanying drawings, configurations may be exaggerated, omitted, or schematically shown, and the sizes of the configurations do not fully reflect the actual sizes. The present invention is not limited to the relative sizes of gaps shown in the accompanying drawings.

Throughout the present specification, unless explicitly described otherwise, "comprising" any components will be understood to imply the inclusion of other components rather than the exclusion of any other components. Further, when an element is referred to as being "connected with" another element it may be "directly connected" to the other element and may also be "electrically connected" to the other element with another element intervening therebetween.

Singular forms are intended to include plural forms unless the context clearly indicates otherwise. It will be further understood that the terms "comprises" or "have" used in this specification, specify live presence of stated features, steps, operations, components, parts, or a combination thereof, but do not preclude the presence or addition of one or more other features, numerals, steps, operations, components, parts, or a combination thereof.

Hereafter, embodiments of the present invention will be described in detail with reference to the accompanying drawings such that those skilled in the an can easily accomplish the present invention. However, the present invention may be modified in various different ways and is not limited to (the embodiments described herein. Further, in the accompanying drawings, components irrelevant to the description will be omitted in order to obviously describe the present invention, and similar reference numerals will be used to describe similar components throughout the specification.

Hereinafter, exemplary embodiment of the present invention will be described in detail with reference to the accompanying drawings.

Figure 2:
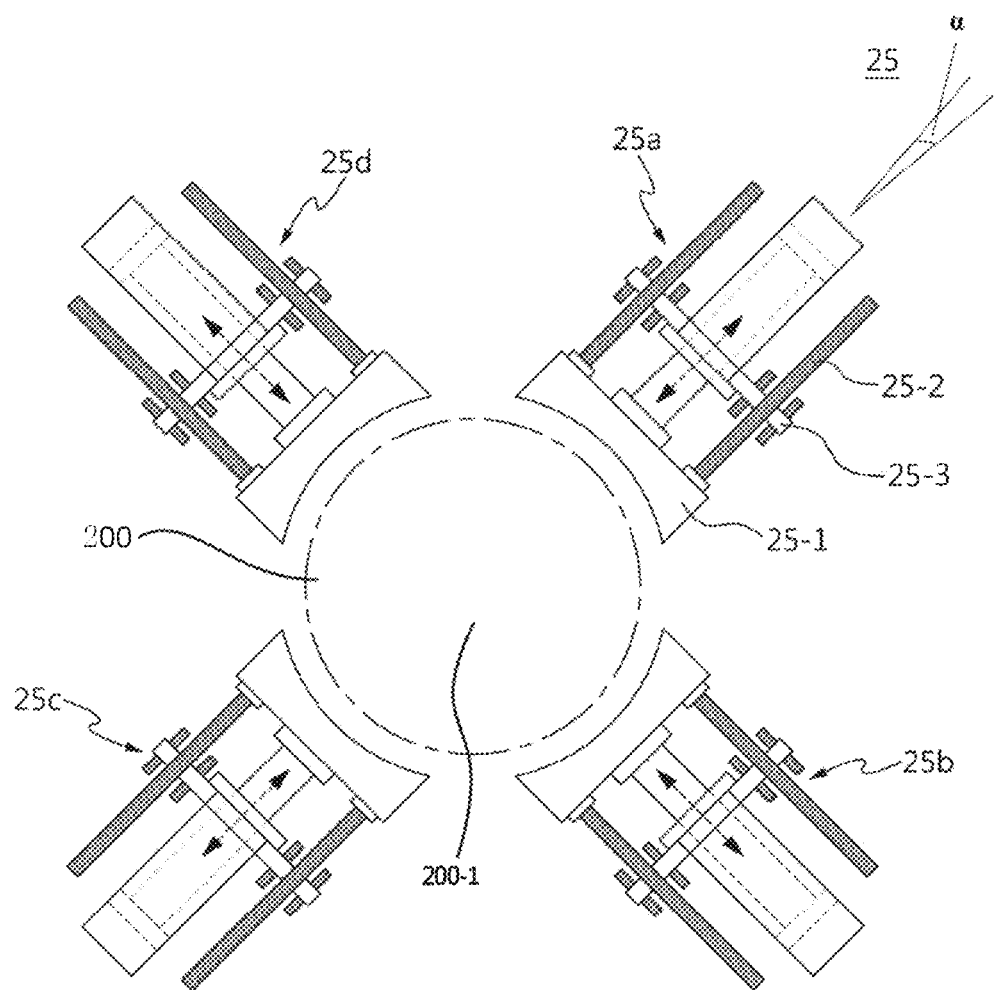
FIG. 2 is a view showing a clamp of a support frame of FIG. 1.
Figure 3:
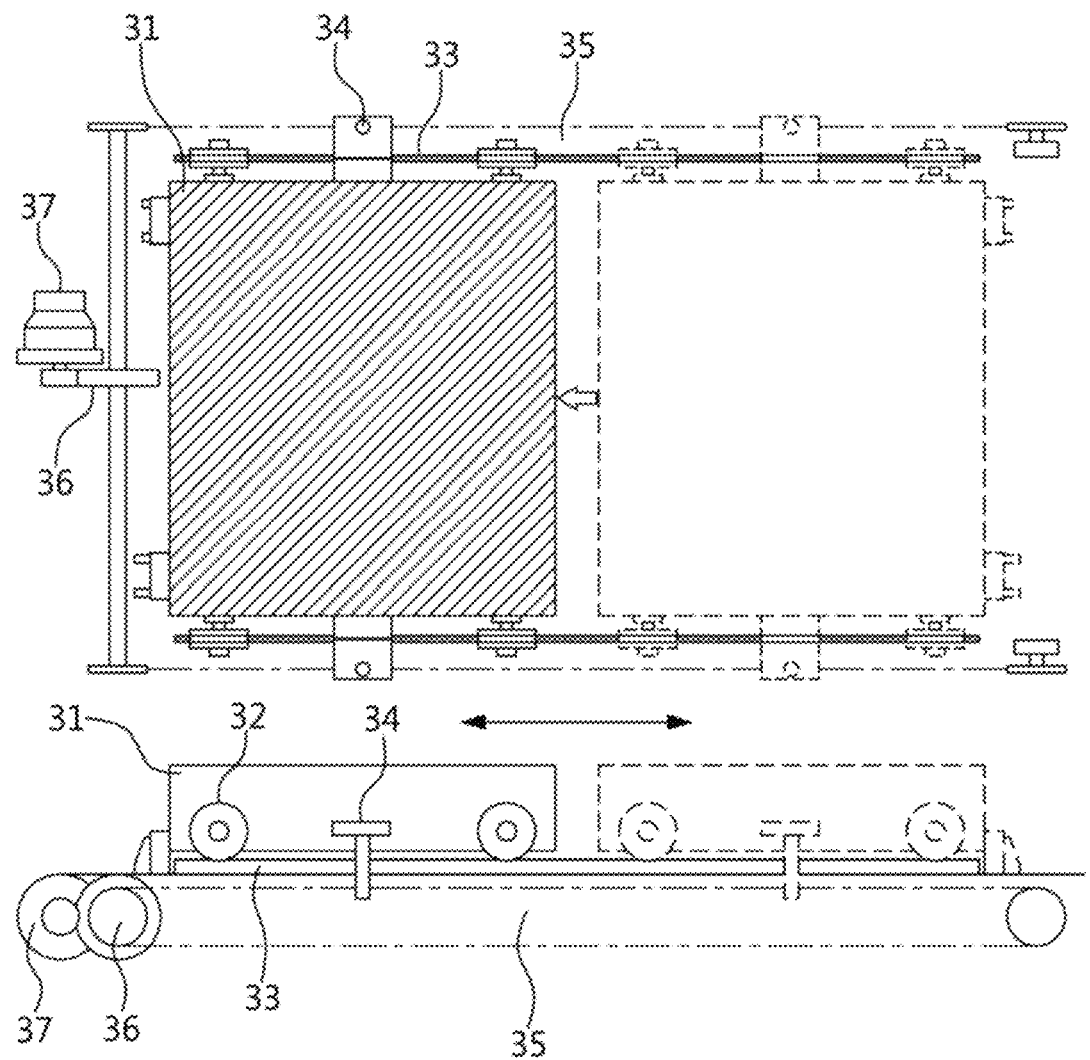
FIG. 3 is a view showing a sliding deck of FIG. 1.
Figure 4:
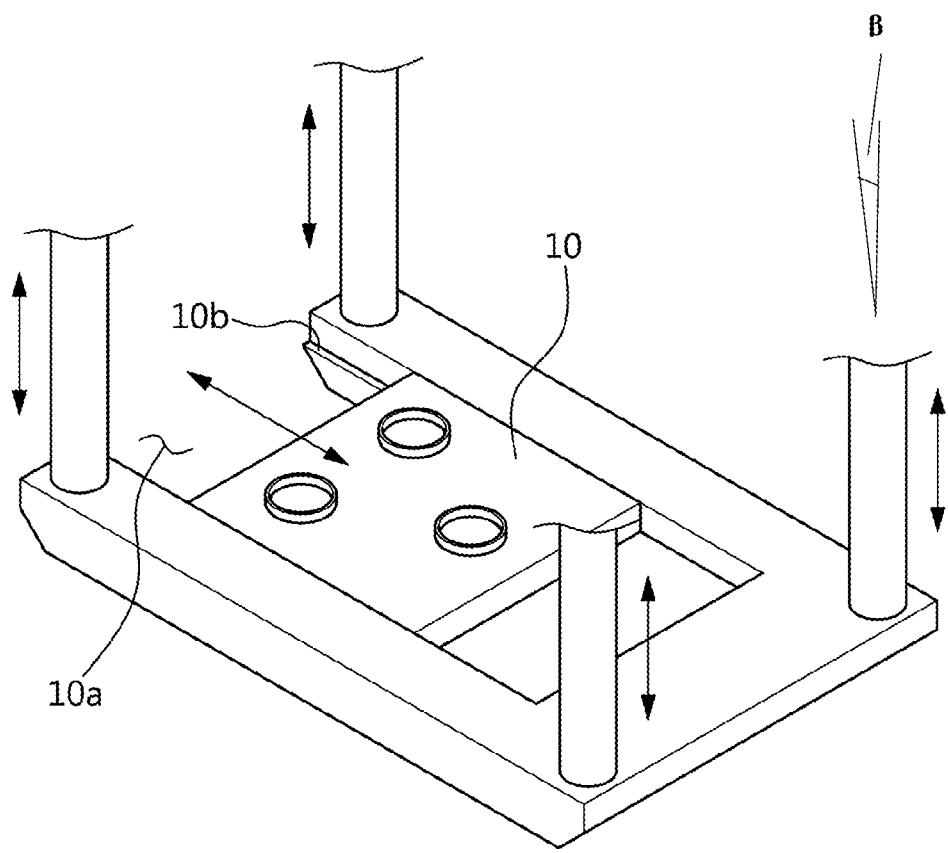
FIG. 4 is a view showing another embodiment of the sliding deck of FIG. 1.
Figure 5:
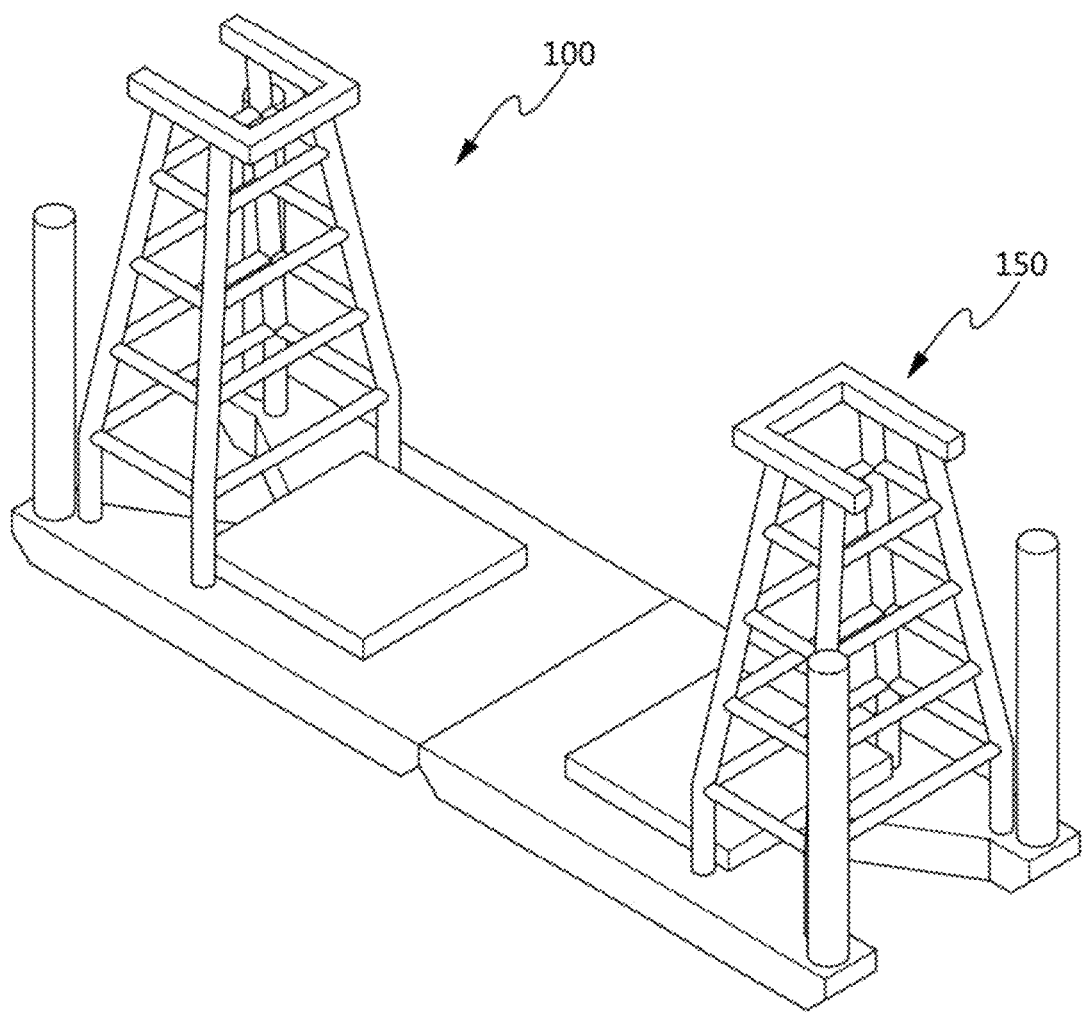
FIG. 5 is a view showing the case when another vessel is connected to the vessel of FIG. 1.

FIG. 1 is a view showing a vessel for transporting and installing a offshore wind power generator according to an embodiment of the present disclosure, FIG. 2 is a view showing clamps of a support frame of FIG. 1, FIG. 3 is a view showing a sliding deck of FIG. 1, FIG. 4 is a view showing another embodiment of the sliding deck of FIG. 1, and FIG. 5 is a view showing the case when another vessel is connected to the vessel of FIG. 1.

As shown in FIG. 1, an offshore wind power generator (hereafter, referred to as a 'vessel' 100) according to an embodiment of the present disclosure is a multi-purpose mobile base transporting and installing the entire structure of a wind power generator at a target site with a substructure (not shown) and a wind power turbine assembled in advance at the shore such as in a harbor(not shown) or at a quay wall(not shown) of a shipyard(not shown).

Since the substructure and the wind power turbine can be assembled in advance using cranes on land, the cost is reduced in comparison to using sea cranes. Open-sea installation work does not require precise stability of a vessel, unlike assembly work that requires bolting for each part, so it is possible to sufficiently install structures on the sea even without a jack-up barge.

The vessel 100 enables a process of loading an offshore wind power generator assembled at a quay wall thereon, transporting the offshore wind power generator to an installation place, and then unloading and installing the offshore wind power generator.

Referring to FIG. 1, the vessel 100 has a vessel body opening portion 10a at the tail of the vessel body 10 to minimize interference due to a substructure of an offshore wind power generator when the offshore wind power generator is loaded on the vessel body 10, and to directly unload the offshore wind power generator on the sea when the offshore wind power generator loaded on the vessel body 10 is installed at a specific installation place.

The vessel 100 includes: a support frame 20 that supports and fixes an offshore wind power generator when the offshore wind power generator is transported, and enables the offshore wind power generator to be moved perpendicularly to the sea surface when the offshore wind power generator is loaded and installed; a sliding deck 30 that can open and close the vessel body opening portion 10a horizontally to the sea surface; and a plurality of spuds 40-1, 40-2, 40-3, and 40-4 that fixes the vessel body 10 when the offshore wind power generator is installed at a specific installation place, in which these components are disposed on the vessel body 10.

First, the support frame 20 is an A-type frame vertically formed on the vessel body 10 and is connected with a winch (not shown) that can lift or put down the offshore wind power generator.

The winch can vertically lift or put down the offshore wind power generator by winding or unwinding a wire.

The wire connected to the winch is connected to the offshore wind power generator while being supported by a pulley disposed at the top of the support frame 20. In detail, the offshore wind power generator may use a suction pile platform as the base of the structure. The suction pile platform has a lug that can be connected to an equalizer block. Accordingly, the wire connected to the winch is fastened to the lug of the suction pile platform. That is, the wire connected to the winch is connected to the lower end of the center of gravity of the offshore wind power generator.

The support frame 20, referring to FIG. 2, a clamp 25 that supports the upper end of the center of gravity 200-1 of the offshore wind power generator 200.

The clamp 25 is composed of four hydraulic devices 25a, 25b, 25c, and 25d orthogonally coupled to each other to support the upper end of the center of gravity 200-1 of the offshore wind power generator 200. That is, one hydraulic device 25c includes a holder 25-1 supporting the upper end of the center of gravity 200-1 of the offshore wind power generator 200, and a guide bar 25-2 and a bracket 25-3 for attaching and detaching the holder 25-2 to and from the offshore wind power generator 200.

The clamp 25 enables a rotational angle (α) about a horizontal axis to be maintained maximally within 7° when the offshore wind power generator is transported or vertically moved, by supporting the offshore wind power generator.

The clamp 25 enables a rotational angle about a horizontal axis to be maintained maximally within 7° when the offshore wind power generator is transported or vertically moved, by supporting the offshore wind power generator.

As described above, the support frame 20 enables the offshore wind power generator to be moved through operation of the winch in the horizontal direction, and limits movement of the offshore wind power generator within a predetermined rotational angle in the vertical direction using the clamp 25. The clamp 25 is used because it is required to prevent horizontal movement of live offshore wind power generator when the offshore wind power generator is vertically installed on the sea.

Next, the sliding deck 30 can open and close the vessel body opening portion 10a because it can horizontally move with respect to the vessel body 10. That is, the sliding deck 30 closes the vessel body opening portion 10a by moving to the tail when the offshore wind power generator is transported. In this state, the offshore wind power generator lifted on the support frame is seated down on the sliding deck 30.

Further, the sliding deck 30 opens the vessel body opening portion 10a by moving to the head when the offshore wind power generator is installed.

In particular, since the offshore wind power generator is seated on die sliding deck 30 when it is transported, movement of the offshore wind power generator can be minimized and external force applied to the clamp can be distributed.

In detail, the sliding deck 30, referring to FIG. 3, includes a moving deck 31, wheels 32, rails 33, chain brackets 34, chains 35, a driving assembly 36, and a driving motor 37.

The moving deck 31 has two wheels 32 at each of both left and right sides and the wheels 32 move on the rails 33.

The chain brackets 34 connected to the chains 35 are disposed on both left and right sides of the moving deck 31. The chains 35 disposed at both left and right sides are connected to the driving motor 37 through the driving assembly 36. The chains 35 are turned by rotational driving of the driving rotor 37.

Accordingly, as the chains 35 are tuned by the driving motor 37, the moving deck 31 horizontally moves.

Meanwhile, the sliding deck 30 may move using sliding channels 10b formed on sides of the vessel body opening portion 10a without being exposed outside from the vessel body 10 to open and close the vessel body opening portion 10a.

The spuds 40-1, 40-2, 40-3, and 40-4 are circular or polygonal supports that are disposed at specific positions on the vessel body 10 and can be vertically moved to the bottom of the sea to fix the vessel 100. The spuds 40-1, 40-2, 40-3, and 40-4 are disposed at four corners of the vessel body 10. T the spuds 40-1, 40-2, 40-3, and 40-4 additionally fix the vessel 100 other than moving the vessel 100 in a taut method that uses an auto-tension winch when the offshore wind power generator is installed.

The spuds 40-1, 40-2, 40-3, and 40-4 support the vessel body 10 on the bottom of the sea using a ballast tank or hydraulic pressure therein. Accordingly, a rotational angle (β) about a vertical axis of the offshore wind power generator can be maintained within 5° in consideration of a cable direction, and the lower support of the offshore wind power generator can be installed within a maximum radius of 5 m at designated coordinates on the bottom of the sea.

As described above, the vessel 100 can satisfy the limit conditions for transporting and installing the offshore wind power generator.

That is, the vessel 100 can satisfy the limit conditions that the rotational angle (α) about the horizontal axis should be maintained within maximum 7° when the offshore wind power generator is transported in consideration of stability of the offshore wind power generator, the rotational angle (β) about the vertical axis should be maintained within 5° in consideration of the cable direction of the offshore wind power generator when the offshore wind power generator is installed on the sea, and the lower support of the offshore wind power generator should be installed within a maximum radius of 5 m at the designated coordinates on the bottom of the sea.

Referring to FIG. 5, the vessel 100 can load, transport, and install one or two completely assembled offshore wind power generators simultaneously, vessel body of other vessels 150 to the vessel body of the vessel 100.

An offshore wind power generator is loaded and transported on the vessel 100, as described above.

An offshore wind power generator is assembled in advance at the quay wall of a harbor. The vessel 100 is moved to and moored at the quay wall. Thereafter, a wire connected to the winch of the support frame 20 is fastened to the offshore wind power generator. The clamp is operated toward the offshore wind power generator. The offshore wind power generator is vertically lifted by the support frame 20, the sliding deck 30 is moved to the tail, and then the offshore wind power generator is seated down on the sliding deck 30. In this process, the clamp 25 fixes the offshore wind power generator in a closed state. The moored vessel 100 is released for transportation.

Further, the offshore wind power generator is installed at an installation place by the vessel 100.

When the vessel 100 arrives at an installation place, the spuds 40-1, 40-2, 40-3, and 40-4 are vertically lowered and fixed. In this process, the vessel 100 is moored. Thereafter, a wire connected to the winch of the support frame 20 is fastened to the offshore wind power generator. The offshore wind power generator is vertically lifted by the support frame 20 and then the sliding deck 30 is moved to the head. The offshore wind power generator is vertically put down by the winch of tire support frame 20. In this process, the offshore wind power generator is put down until the suction pile platform reaches the bottom of the sea. Thereafter, the clamp is opened and suction is started. When the suction is finished, the moored vessel 100 is released and the spuds 40-1, 40-2, 40-3, and 40-4 are returned.

Although above description addresses new characteristics of the present invention that are applied to various embodiments, it will be understood by those skilled in the art that the configuration and derails of the device and method described above may be removed, replaced, and modified in various way without departing from the scope of the present invention. Accordingly, the scope of (the preset invention is defined by the following claims rather than the above description. All modifications within equivalent ranges to the claims are included in the scope of tire present invention.

What is claimed is:

1. A vessel for transporting and installing an offshore wind power generator, the vessel comprising:
   a vessel body including a vessel body opening portion at a stern of the vessel body;
   a support frame which enables the offshore wind power generator to move vertically through the vessel body opening portion; and
   a sliding deck configured to move horizontally with respect to the vessel body to open and close the vessel body opening portion,
   wherein the support frame includes a clamp that supports an upper end of the offshore wind power generator when the offshore wind power generator is transported or vertically moved,
   wherein the clamp includes four hydraulic devices orthogonally coupled to each other to support the upper end of the offshore wind power generator, and
   wherein the clamp maintains a rotational angle about a horizontal axis of the offshore wind power generator within maximum 7°.

2. The vessel of claim 1, wherein the offshore wind power generator is seated on the sliding deck when the offshore wind power generator is transported.

3. The vessel of claim 1, wherein the sliding deck is formed on the vessel body or is formed through sliding channels formed on sides of the vessel body opening portion.

4. The vessel of claim 1, further comprising: another vessel including a vessel body is connected to the vessel body of the vessel to load transport, and install a plurality of offshore wind power generators.

* * * * *